United States Patent Office 3,328,638
Patented June 27, 1967

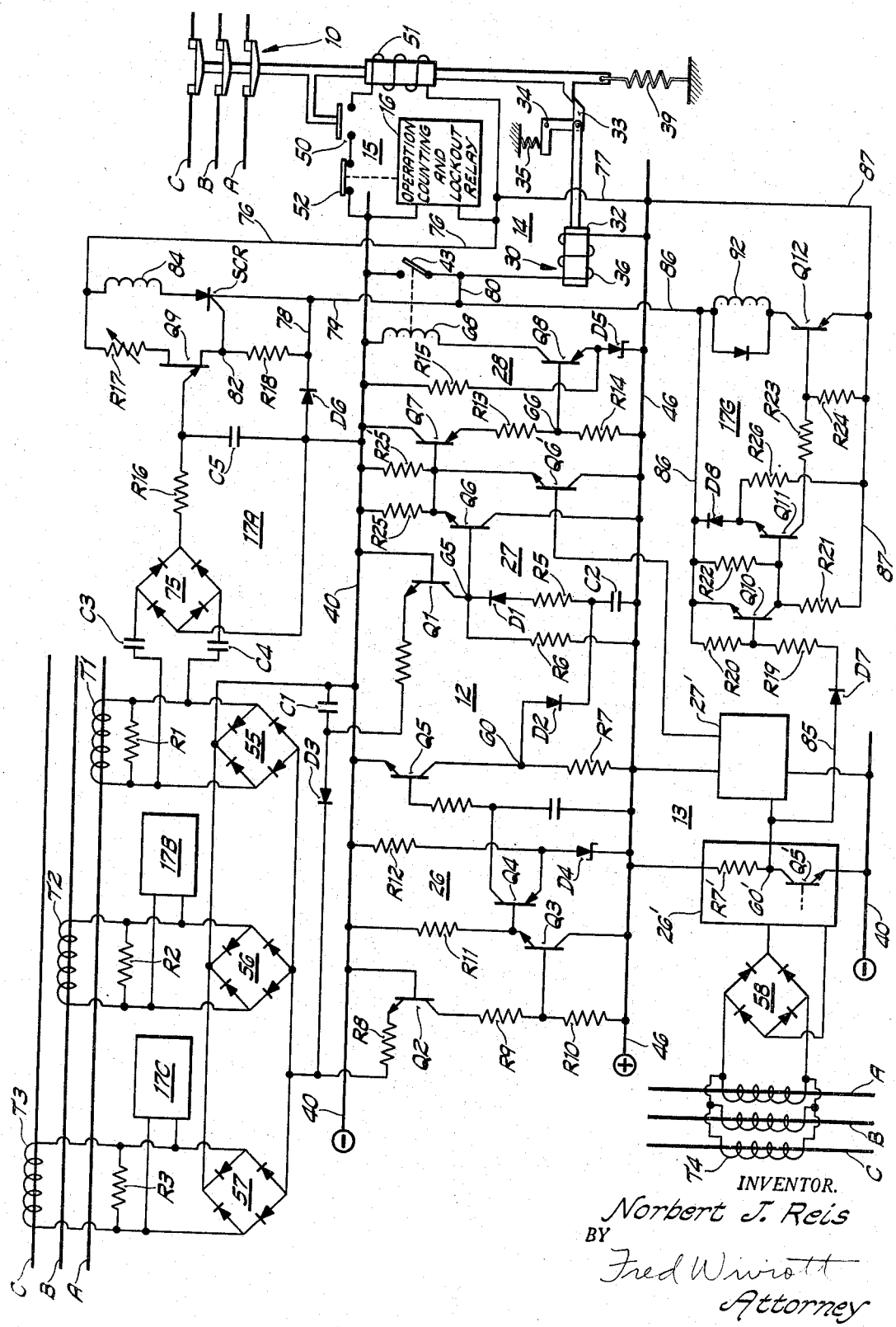

---

3,328,638
REPEATING CIRCUIT INTERRUPTER HAVING FAULT INDICATING MEANS
Norbert J. Reis, Milwaukee, Wis., assignor to McGraw-Edison Company, Milwaukee, Wis., a corporation of Delaware
Filed Apr. 13, 1964, Ser. No. 359,331
15 Claims. (Cl. 317—22)

This invention relates to polyphase circuit interrupters and, more particularly, to means for indicating which of the phases of a polyphase system has caused circuit breaker operation and the nature of the fault itself.

Many power supply systems are protected by reclosers or repeating automatic circuit interrupters which interrupt the system upon the occurrence of an abnormal condition. Because most abnormal circuit conditions are temporary in nature and will clear in a relatively short time, such automatic protective devices are arranged to execute a series of successive opening and reclosing operations. If the fault has not cleared after a predetermined number of such opening and closing operations, usually three, it is considered permanent and the circuit interrupter is then locked in open position. In order to determine the origin of such permanent faults, it is necessary to know in which phase of a polyphase system the fault occurred and whether or not a ground fault was involved.

In addition, an abnormal number of temporary faults in the system may indicate incipient system failure. This is especially true if most or all of the transient faults occur in the same phase.

It is an object of the invention to provide a circuit interrupter with means for indicating in which phase of a polyphase system the circuit breaker operating fault occurred.

A further object of the invention is to provide means for indicating whether the abnormal circuit condition which caused circuit breaker operation involved a ground fault.

A more specific object of the invention is to provide a polyphase circuit interrupter including main switch means, abnormal condition responsive means, switch opening means coupled to the abnormal condition responsive means for opening the main switch means upon the occurrence of an abnormal circuit condition, a plurality of abnormal condition indicating means each connected to a different phase and to the switch opening means and being independently operative to give an indication upon the occurrence of an abnormal circuit condition in its associated phase and upon the actuation of the switch opening means. A still more specific object of the invention is to provide such circuit interrupters with ground fault sensing means operative to actuate the switch opening means upon the occurrence of a ground fault, ground fault indicating means connected to the ground fault sensing means and to the switch opening means and being operative to give an indication upon the occurrence of a ground fault and upon the operation of the switch opening means.

These and other objects and advantages of the instant invention may be more apparent from the detailed description thereof taken with single figure of the accompanying drawing which schematically illustrates a polyphase circuit interrupter incorporating the instant invention.

Referring now to the drawing in greater detail, a polyphase system having phases A, B and C is shown to be protected by a polyphase repeating circuit interrupter having main interrupting switches 10, a phase overcurrent responsive circuit 12, a ground fault responsive circuit 13, switch opening means 14, switch closing means 15, and operation counting and lockout means 16.

In addition, the circuit interrupter includes phase fault indicating circuits 17A, 17B and 17C for indicating in which of the system phases A, B or C the fault causing circuit breaker operation occurred and a ground fault indicating circuit 17G for indicating whether or not a ground fault was involved.

In general terms, the phase overcurrent responsive circuit 12 is operable to actuate the switch opening means 14 upon the occurrence of an overload in one of the phases A, B or C and the ground fault responsive circuit 13 is operative to actuate said switch opening means upon the occurrence of a ground fault. When the main switches 10 reach their fully open position, the reclosing means 15 is made operable to return the interrupting switches 10 to their closed position. If the fault does not clear after a predetermined number of such switch opening operations, the operation counting and lockout relay 16 becomes operative to prevent further reclosure of the main switches 10.

For a more complete description of the circuit breaker operating mechanism usable with the illustrated control mechanism, reference is made to copending application Ser. No. 56,259 filed Sept. 15, 1960, and assigned to the assignee of the instant invention.

The phase overcurrent responsive circuit 12 is shown coupled to each of the phases A, B and C, and includes a phase overcurrent sensing circuit 26, a phase timing circuit 27 and an output circuit 28. The ground fault responsive circuit 13 is shown to include a ground fault sensing circuit 26' coupled to each of the phases A, B and C, and a ground timing circuit 27' coupled to the ground fault sensing circuit 26' and to the output circuit 28.

The phase overcurrent responsive circuit 12 and the ground fault responsive circuit 13 will be discussed in greater detail below, it being sufficient at this point to state that when a predetermined overcurrent is sensed by the overcurrent sensing circuit 26, or a predetermined unbalance current is sensed by the ground fault sensing circuit 26', a signal is provided to their respective timing circuits 27 or 27'. Upon the receipt of this signal, the timing circuits 27 or 27' initiate a timing operation, and, after a predetermined interval, provide a signal to the output circuit 28 which initiates an opening operation of the interrupting switches 10 by closing normally opened contacts 43.

The switch opening means 14 includes an electromagnetic tripper 30 having a plunger 32 and a coil 36. The plunger 32 is coupled to a latch crank 33 which is normally urged in a counterclockwise direction about pivot point 34 by a reset spring 35 to hold the main switches 10 in closed position against the influence of an opening spring 39. When contacts 43 are closed upon the occurrence of an abnormal circuit condition, the coil 36 is placed in circuit between the negative power supply bus 40 and the positive power supply bus 46. This rotates crank 33 clockwise to release the main switches 10 for movement toward their open position under the influence of opening spring 39. When the main switches are open, contacts 43 are returned to their normal open position to de-energize coil 36 so that crank 33 may be returned to its initial position by reset spring 35. Trip portion 14 is thereby reset in a position to relatch the main switches 10 when they are returned to their closed position.

When the main switches 10 reach their fully open position, normally open contacts 50 are closed to complete an energizing circuit through a switch closing solenoid 51 whereupon the main switches 10 are reclosed. Should fault current reappear in the system being protected, a second switch opening and reclosing operation will be initiated in the manner previously described. Should the fault persist after a predetermined number of such opening and reclosing operations, the operation counting and lockout relay 16 will open normally closed contacts 52 to thereby prevent the further reclosure of the main switches 10 until a switch closing operation is manually initiated. For a complete description of operation counting and lockout means usable with the illustrated circuit interrupter, reference is made to said copending application serial number mentioned above.

Referring now to the phase overcurrent sensing circuit 12, it is shown coupled to each of the phases A, B and C by current transformers T1, T2 and T3 respectively. The secondaries of current transformers T1, T2 and T3 are respectively connected to the input terminals of full wave rectifiers 55, 56 and 57, whose output terminals are connected in parallel. In addition, resistors R1, R2 and R3 are respectively connected across the secondaries of the current transformers T1, T2 and T3, so that a voltage will be derived across each which is proportional to the current in their respective phases and the largest of these voltage drops will appear across capacitor C1.

The ground fault sensing circuit 26' is coupled to phases A, B and C by a three-phase current transformer T4 which has the input of a full wave rectifier 58 connected in its neutral leg. The output of rectifier 58 is connected to the ground fault sensing circuit 26' so that said circuit will receive a current signal proportional to the ground fault or unbalance current flowing in the system A, B, C.

The timing circuit 27 includes a timing capacitor C2 connected in series with a timing resistor R5 and a diode D1 and the series combination is connected in parallel with the second timing resistor R6. As more fully described in copending application Ser. No. 800,567, filed Mar. 19, 1959, and assigned to the assignee of the instant invention, the impedance values of capacitor C1 and resistors R5 and R6 determine the opening time delay for any given phase overcurrent.

In operation, the current flowing to the collector of a transistor Q1, which is a function of the voltage across capacitor C1, will split between the parallel paths defined by timing resistor R6 and the series combination of timing resistor R5 and timing capacitor C2. When there is no fault current in any of the phases, capacitor C2 is prevented from charging because it is shunted by a leakage resistor R7 in the overcurrent sensing circuit 26 to which it is connected by a blocking diode D2.

The overcurrent sensing circuit 26 is also coupled to capacitor C1 through a resistor R8 and a diode D3, so that a current proportional to the highest peak currents in any of the phases A, B or C, will be applied to the emitter of transistor Q2. This results in a proportional transistor Q2 collector current through resistors R9 and R10. The base of a transistor Q3 is connected between resistors 9 and 10 so that its emitter current flowing through resistor R11 is also proportional to said peak current. The base of a transistor Q4 is connected to R11 while its emitter is held at a fixed potential by a Zener diode D4 and a resistor R12 connected in series between the supply buses 40 and 46. Thus, by a proper selection of components, transistor Q4 can be rendered conductive when the current in any of the phases equals or exceeds the desired minimum actuating current of the device.

Upon the occurrence of an overcurrent in the system, therefore, transistor Q4 becomes conductive, passing current to the base of an output transistor Q5. Upon this event, transistor Q5 will become conductive to connect the leakage resistor R7 to the negative bus 40. This, in turn, causes terminal 60 to assume a negative potential so that diode D2 isolates terminal 60 from capacitor C2 whereby leakage current can no longer flow to resistor R7 from capacitor C2. As a result, timing capacitor C2 is prevented from discharging through leakage resistor R7 and, therefore, begins charging. In this manner, the timing operation is initiated.

As timing capacitor C2 charges up, the potential at the junction point 65 between diode D1 and the base of a coupling transistor Q6 will begin raising, so that Q6 emitter current through resistor R25, which is proportional to the potential at point 65 will similarly rise. As a result, transistor Q7 whose base is connected to resistor R25 will draw proportional current through resistors R13 and R14 so that the potential of junction point 66 between said resistors will follow the potential of junction point 65. The base of a transistor Q8 is connected to junction point 66 while its emitter is held at a constant potential by a Zener diode D5 and a resistor R15 connected in series across the power supply buses 40 and 46.

After timing capacitor C2 has charged for a pre-determined time, which is the time delay for the opening operation, the potential at junction point 66 will reach the point where transistor Q8 is rendered conductive. Relay 68 will thus be energized to close contacts 43 and thereby initiate an opening operation of the main switches 10 in the manner described hereinabove. The closing of contacts 43 can be considered as an electrical signal required to cause a switch opening operation.

Because the ground fault sensing circuit 26' and the ground fault timing circuit 27' are identical with the phase overcurrent circuit 26 and the phase timing circuit 27, except for the size of certain components, they will not be discussed in detail, for the sake of brevity. It is sufficient, for an understanding of the invention, to state that when a ground fault occurs in the system it is sensed by the ground fault sensing circuit 26' in the same manner that an overcurrent is sensed by the phase overcurrent sensing circuit 26. This causes transistor Q5' to become conductive, thereby connecting junction point 60' to the negative bus 40 whereby a timing operation is initiated by the ground fault timing circuit 27'. After a predetermined time delay, the emitter current of transistor Q6', flowing through resistor R25', will be sufficient to cause the energization of relay coil 68 in the manner discussed above. Contacts 43 are thereby closed to initiate a switch opening operation.

Each of the phase fault indicating circuits 17A, 17B and 17C is connected in parallel with its associated resistors R1, R2 and R3, respectively, so that each receives an input signal proportional to the current flowing in its associated phase. Each of the circuits 17A, 17B and 17C is identical and each is identically connected to the remaining portions of the circuit so that only the circuit 17A will be discussed in detail for the sake of brevity.

The phase fault indicating circuit 17A includes a full-wave rectifier 75 whose input terminals are connected in parallel with resistor R1 through coupling capacitors C3 and C4. A capacitor C5 is connected to the output terminals of rectifier 75 through resistor R16 so that the voltage across capacitor C5 will be proportional to the current in phase A. The emitter of a uni-junction transistor Q9 is connected to one terminal of capacitor C5 while its base-one electrode is connected to the other terminal of capacitor C5 through resistor R18 and a blocking diode D6. As a result, an emitter-base-one potential will appear across uni-junction Q9 which is equal to the voltage across capacitor C5. The base-two electrode of uni-junction Q9 is connected to the positive bus 46 through resistor R17 and conductors 76 and 77. The base-one electrode of uni-junction Q9 is also connected to the negative bus 40 through resistor R18, conductors 78, 79 and 80, and normally open contacts 43. As a result, uni-junction Q9 will be open-circuited when contacts 43 are open.

The gate electrode of a controlled rectifier SCR is connected to the junction 82 between the base-one electrode of Q9 and resistor R18 while its anode is connected to positive bus 46 through conductors 76 and 77 and a series connected electroresponsive indicator symbolized by the coil 84. In addition, the cathode of SCR is connected to the negative bus through conductors 79 and 80 and normally open switch 43. It can thus be seen that the controlled rectifier SCR will also be open circuited when the contacts 43 are open.

The uni-junction transistor Q9 is a device which will conduct emitter-base-one current when its emitter-base-one voltage is a predetermined proportion of its base-one-base-two voltage. As stated hereinabove, the emitter base-one voltage is proportional to the current flowing in phase A. While the base-one electrode is normally open-circuited by contacts 43, when said contacts are closed, the base-one-base-two voltage will be proportional to the potential difference between the negative bus 40 and the positive bus 46, which is a fixed value. Thus, uni-junction Q9 will become forward-biased and conduct emitter-base-one current through resistor 18 when contacts 43 are closed and when the current in phase A reaches a predetermined value. The current value in phase A necessary to cause Q9 to be conductive can be adjusted by modifying the resistance of R17.

When a fault occurs in phase A, for example, the voltage across C5 will begin increasing until it reaches the value necessary to cause Q9 to be forward-biased. However, Q9 does not become conductive because its base-one electrode is open circuited by reason of contacts 43 being open.

Simultaneously, the overcurrent in phase A will be sensed by the overcurrent sensing circuit 26 so that transistor Q5 becomes conductive to connect junction point 60 to the negative bus 40 so that the timing capacitor C2 can no longer discharge through resistor R7. Capacitor C2 begins charging, and after a time delay, the potential junction point 65 of the timing circuit 27 will be sufficiently high so that transistor Q8 will become conductive to energize relay 68 and close contacts 43, thereby resulting in a circuit breaker opening operation as discussed hereinabove. The closing of contacts 43 also completes an energizing circuit across the uni-junction transistor Q9 so that it will become conductive as capacitor C5 discharges through its emitter-base-one circuit, resistor 18, conductor 78 and 79 and contacts 43 to a negative bus 40. The resulting voltage drop across the resistor 18 will present a sufficient gate voltage to controlled rectifier SCR so that the latter is turned on to energize the indicating and counting device 84. In this manner, a fault in phase A is indicated and recorded. When contacts 43 open, upon the opening operation of the main contacts 10, the uni-junction transistor Q9 and the controlled rectifier SCR are open-circuited so that each will cease conducting.

Should a fault occur in phase B, on the other hand, it will also be sensed by the overcurrent sensing circuit 26, which will initiate a timing operation of the timing circuit 27 whereupon after a time delay the output circuit 28 will close contacts 43 to initiate a switch opening operation. The closing of contacts 43, initiated by a fault in phase B will complete an energizing circuit across the unijunction Q9. However, because abnormal current does not flow in phase A, the voltage across capacitor C5 will be insufficient to forward bias uni-junction Q9 and, consequently, it will remain non-conductive so that controlled rectifier SCR does not energize the indicating counting device 84. Thus, the fault in phase B does not activate the fault indicating or counting circuit 17A. It will be appreciated, however, that the fault in phase B will be indicated and recorded by the fault indicating the recording circuit 17B upon the closing of contacts 43, since it will be recalled that it is identical to the circuit 17A and is connected to contacts 43 in the same manner. Similarly, a fault in phase C will be indicated and recorded by the circuit 17C without actuating the circuits 17A or 17B.

The ground fault indicating and recording circuit 17G includes a first transistor Q10 whose base is connected to junction point 60' of the ground fault sensing circuit 26' by a conductor 85, a diode D7 and a resistor R19. The emitter of Q10 is connected to the negative bus 40 by conductors 86 and 80 and contacts 43. A bias resistor R20 is connected between the emitter and base of Q10 while its collector is connected to the positive bus 46 by resistor R21 and conductor 87. The base of a second transistor Q11 is connected to the collector of Q10 while its emitter is connected to conductor 87 by resistor R25 and to conductor 86 by diode D8 and its collector is connected to conductor 87 through resistors R23 and R24. The base of a third transistor Q12 is connected between resistors R23 and R24 while its emitter is connected to conductor 87 and its collector is connected to conductor 86 through an indicating and recording device symbolized by the coil 92.

Assume that a ground fault occurs, causing unbalance circuit conditions in the phases A, B and C. This will be sensed by the ground fault overcurrent sensing circuit 26', causing transistor Q5' to become conductive and connect junction point 60' to the negative bus 40. As a result, a timing operation will be initiated by the ground fault timing circuit 27' so that after a time delay transistor Q6' in the output circuit 28 will become conductive to initiate the energization of relay coil 68, which closes contacts 43, whereby the main switches 10 are opened.

The closing of contacts 43 upon the occurrence of a ground fault also completes an energizing circuit to the ground fault indicating circuit 17G. In addition, because energization of transistor Q5' connects terminal 60' to the negative bus 40, transistor Q10 is reverse biased and non-conductive. As a result, current will flow from conductor 87 to conductor 86 through resistors R21 and R22, so that the resulting drop across R22 will forward bias transistor Q11, causing collector current to flow through resistors R23 and R24. The drop across resistor R24 in turn forward biases Q12 so that Q12 collector current flows through the indicator and recorder 92 which operates to indicate that a ground fault has occurred. When the contacts 43 open upon the opening of the main switches 10, the ground fault indicating and recording circuit 17G will be de-energized.

Assume that a fault occurs in one of the phases A, B or C, but there is no ground fault current. As a result, transistor Q5' will not become conductive, so that terminal 60' has some positive potential. When the contacts 43 close to interrupt the phase fault current and energize the ground fault indicating circuit 17G, the base of transistor Q10 will receive a positive signal so that Q10 will be forward biased. As a result, Q10 will become conductive to substantially short circuit R22 so that there will be insufficient voltage drop across resistor R22 to forward bias Q11 whereby it remains non-conductive. As a result, no current flows through R24, so that Q12 also remains non-conductive and the ground fault indicating device 92 is not energized. It can thus be seen upon the occurrence of a phase fault the ground fault indicating circuit 17G is not activated.

It can thus be seen that each of the indicating circuits 17A, 17B and 17C will be operative when a fault occurs in its phase and when it receives a signal that a switch opening operation has occurred, i.e., the closing of contacts 43. Similarly, ground fault indicating circuit 17G will operate when a ground fault occurs and when a switch opening signal is given.

While only a single embodiment of the invention has been shown and described, and while it has been illustrated with respect to one particular type of circuit interrupter, it is not intended to be limited thereby but only by the scope of the appended claims.

I claim:
1. A polyphase circuit interrupter including main switch means in circuit with an electric system, abnormal condition responsive means coupled to said system, switch operating means coupled to said abnormal condition responsive means for opening said main switch means when an electric quantity in said system exceeds a predetermined value indicating an abnormal circuit condition, a plurality of abnormal condition indicating means, each of said abnormal condition indicating means being connected to a different phase in said system and including condition sensing means coupled to its associated phase for deriving an electrical signal functionally related to the electrical quantity in said phase, each of said abnormal condition indicating means also including level detecting indicator means connected to said switch operating means and to its sensing means and operable to produce an indication when the signal produced by its sensing means equals a predetermined value representative of an abnormal condition in its phase and upon the opening of said switch means, said level detecting indicator means being nonresponsive when the signal produced by its sensing means is less than said predetermined value and said switch means is opened in response to an abnormal condition in another phase.

2. The circuit interrupter set forth in claim 1 and including ground fault sensing means coupled to said system and to said switch operating means and operative to open said main switch means upon the occurrence of a ground fault in said system, ground fault indicating means connected to said ground fault sensing means and to said switch operating means and being operative to give an inidication upon the occurrence of a ground fault and upon the opening of said main switch means.

3. A polyphase circuit interrupter including main switch means in circuit with an electric system, overcurrent responsive means coupled to said system, switch operating means coupled to said overcurrent responsive means for opening said main switch means upon the occurrence of an overcurrent in said system, a plurality of overcurrent indicating means, each of said overcurrent incidating means being connected to a different phase of said system and including overcurrent sensing means coupled to its associated phase for deriving an electrical signal functionally related to the current in said phase, each of said overcurrent indicating means also including level detecting indicator means connected to said switch operating means and to its sensing means and operable to produce an indication when the signal produced by its sensing means equals a predetermined value representative of an overcurrent in its respective phase and upon the opening of said switch means, said level detecting indicator means being nonresponsive when the signal produced by its sensing means is less than said predetermined value and said switch means is opened in response to an overcurrent in another phase.

4. A polyphase circuit interrupter including main switch means in circuit with a polyphase electric system, overcurrent responsive means coupled to said system and operable to produce a first electrical signal upon the occurrence of an overcurrent therein, output means coupled to said overcurrent responsive means and operable to open said switch means upon the occurrence of said first electrical signal, a plurality of abnormal condition indicating means, each of said abnormal condition indicating means being associated with a different phase in said system and including abnormal condition sensing means coupled to its associated phase for deriving an electrical signal functionally related to the current in its phase, each of said overcurrent indicating means also including level detecting indicator means connected to said output means and to its sensing means and operating when the signal from its sensing means equals a predetermined value representative of an overcurrent in its phase and upon the occurrence of said first electrical signal, said level detecting indicator means being nonresponsive when the signal derived by its sensing means is less than said predetermined value and said switch means is opened in response to an overcurrent in another phase.

5. The circuit interrupter set forth in claim 4 and including ground fault sensing means coupled to each phase of said system and to said output means for producing a second electrical signal upon the occurrence of a ground fault, said output means being operative to open said switch means upon the occurrence of said second electrical signal, ground fault switching circuit means connected to said ground fault sensing means and to said output means, ground fault indicating means connected to said ground fault switching circuit means, said ground fault switching circuit means being operative to actuate said ground fault indicating means upon the occurrence of said second electrical signal and the opening of said switch means.

6. A polyphase circuit interrupter including main switch means in circuit with an electric system, overload responsive means coupled to said system, which opening means coupled to said overload responsive means for opening said main switch means upon the occurrence of an overload current in said system, a plurality of overload indicating means, each of said overload indicating means being associated with a different phase of said system and each including overload means coupled to its associated phase for deriving an electrical signal functionally related to the current in its phase, each of said overload indicating means also including electroresponsive indicating means and level detecting switching circuit means connected to said switch opening means and to its overload means and operable to complete an energizing circuit to its indicating means when the electrical signal from its overload means equals a predetermined value representative of an overload in its respective phase and upon the actuation of said switch opening means, said level detecting switching circuit means being nonresponsive when the electrical signal derived by its associated overload means is less than said predetermined value and said switch means is opened in response to an overload in another phase.

7. A polyphase circuit interrupter including main switch means in circuit with a polyphase electric system, overcurrent responsive means coupled to said system, switch opening means coupled to said overcurrent responsive means for opening said main switch upon the occurrence of an overcurrent, a plurality of overcurrent indicating means, each of said overcurrent indicating means being connected to a different phase of said system and including overcurrent sensing means independent of said overcurrent responsive means and operative to produce a signal functionally related to the magnitude of the current in its respective phase, each of said overcurrent indicating means also including indicator means and level detecting circuit means, each of said level detecting circuit means being connected to its overcurrent sensing means and to said switch opening means and being operative to actuate its associated indicator means when the current functionally related signal exceeds a predetermined value representative of an overcurrent in its phase and upon actuation of said switch opening means, said level detecting circuit means being nonresponsive when the signal derived by its respective sensing circuit means is less than said predetermined value and said switch means is opened in response to an overcurrent in another phase.

8. A polyphase circuit interrupter including main switch means in circuit with a polyphase electric system, abnormal condition responsive means coupled to said system, switch opening means coupled to said abnormal condition responsive means for opening said main switch means upon the occurrence of an abnormal circuit condition, a plurality of abnormal condition indicating means, each of said abnormal condition indicating means being connected to a different phase of said system and including abnormal condition sensing means independent of said abnormal condition responsive means, each of said abnormal condition indicating means also including indicator means and switching circuit means, each of said switching circuit means being connected to its abnormal condition sensing means and to said switch opening means and being operative to actuate its associated indicator means upon the occurrence of an abnormal circuit condition in its phase and upon the actuation of said switch opening means, ground fault sensing means coupled to said switch opening means and operative to actuate said switch opening means upon the occurrence of a ground fault, ground fault switching circuit means connected to said ground fault sensing means and to said switch opening means, and ground fault indicating means connected to said ground fault switching circuit means, said ground fault switching circuit means being operative to actuate said ground fault indicating means upon the occurrence of a ground fault and upon the operation of said switch opening means.

9. A polyphase circuit interrupter including main switch means in circuit with a polyphase electric system, abnormal condition responsive means coupled to said system and operable to produce electrical signal upon the occurrence of an overload in said system, output means coupled to said abnormal condition responsive means and operable to open said switch means upon the occurrence of said electrical signal, time delay circuit means connected to said abnormal condition responsive means and operable to delay said electrical signal, a plurality of abnormal condition indicating means, each of said abnormal condition indicating means being connected to a different phase in said system and to said output means and including abnormal condition sensing means, each of said abnormal condition indicating means also including indicator means and switching circuit means, each of said switching circuit means being connected to said output means and operative to actuate its indicating means upon the occurrence of an abnormal circuit condition in its associated phase and upon the occurrence of said electrical signal, ground fault sensing means coupled to said output means for producing said electrical signal upon the occurrence of a ground fault, ground fault switching circuit means connected to said ground fault sensing means and to said output means, ground fault indicator means connected to said ground fault switching circuit means, said ground fault switching circuit means being operative to actuate said ground fault indicator means upon the occurrence of a ground fault and upon the occurrence of said electrical signal.

10. A polyphase circuit interrupter including main switch means in circuit with an electric system, overload responsive means coupled to said system, switch operating means coupled to said overload responsive means for opening said main switch means upon the occurrence of an overload current in said system, a plurality of overload indicating means, each of said overload indicating means being associated with a different phase of said system and each including input circuit means coupled to its associated phase for deriving a D.C. voltage signal functionally related to the current in its phase and capacitor means coupled to its input circuit means for receiving a charge proportional to the voltage signal derived therein, each of said overload indicating means also including indicator means and level detecting circuit means connected to its associated capacitor and to said switch operating means and to its indicator means and operable to actuate its indicator means when the charge on its capacitor equals a predetermined value representative of an overload current in its respective phase and upon the opening of said switch means, said level detecting circuit means being nonoperative in response to a D.C. voltage signal less than said predetermined value when said switch means is opened by an overload current in another phase.

11. A polyphase circuit interrupter including main switch means in circuit with an electric system, overload responsive means coupled to said system, switch opening means coupled to said overload responsive means for opening said main switch means upon the occurrence of an overload current in said system, a plurality of overload indicating means, each of said overload indicating means being connected to a different phase of said system and each including an input circuit means coupled to its associated phase for deriving an electrical signal functionally related to the current in its phase and an energy storage means coupled to its input circuit means for receiving a charge proportional to its electrical signal, each of said overload indicating means also including an electroresponsive indicator and a first electronic circuit means having a control element connected to its energy storage means and output means connected to said switch opening means and to said indicator and operable to actuate said indicator when the charge received by said energy storage means equals a predetermined value which is representative of an overload in its associated phase and upon the actuation of said switch opening means, said first electronic circuit means being unoperable to actuate said indicator when the charge received by said energy storage means is less than said predetermined value and said switch means is opened in response to an overload in another one of said phases.

12. A polyphase circuit interrupter including main switch means in circuit with an electric system, overload responsive means coupled to said system, switch opening means coupled to said overload responsive means for opening said main switch means upon the occurrence of an overload current in said system, a plurality of overload indicating means, each of said overload indicating means being connected to a different phase of said system and each including an input circuit means coupled to its associated phase for deriving an electrical signal functionally related to the current in its phase and an energy storage means coupled to its input circuit means for receiving a charge proportional to its electrical signal, each of said overload indicating means also including an electroresponsive indicator and a first electronic circuit means having a control element connected to its energy storage means and output means connected to said switch opening means and to said indicator and operable to actuate said indicator upon the occurrence of an overload in its associated phase and upon the actuation of said switch opening means, ground fault sensing means coupled to said switch opening means and operative to actuate said switch opening means upon the occurrence of a ground fault, an electroresponsive ground fault indicator, electronic switching circuit means having a control element connected to said switch opening means and a pair of output circuit means connected to said ground fault sensing means and means connected to said ground fault indicator and to said switch opening means, said electronic switching circuit means being operative to actuate said ground fault indicator upon the occurrence of a ground fault in said system and upon the operation of said switch opening means, said switch opening means being operable upon the completion of a switch opening operation to open-circuit each of said indicators.

13. A polyphase circuit interrupter including main switch means in circuit with an electric system, overload responsive means coupled to said system, switch operating means coupled to said overload responsive means for opening said main switch means upon the occurrence of an overload current in said system, an electrical energy source, a plurality of overload indicating means, each of said overload indicating means being connected to a different phase of said system and each including input circuit means coupled to its associated phase for deriving a D.C. voltage signal functionally related to the current in its phase and capacitor means coupled to its input circuit means for receiving a charge proportional to the voltage signal derived thereby, each of said overload indicating means also including an electroresponsive indictor and electronic level detecting circuit means having control means connected to its associated capacitor and output means connected to said switch operating means and to its indicator and operable to complete an energizing circuit between said indicator to said energy source when the voltage across said capacitor equals a predetermined value representative of an overload in its associated phase and upon the opening of said switch means, said level detecting circuit means being nonoperable to complete said energizing circuit when the voltage across said capacitor is less than said predetermined value and said switch means is opened in response to an overload in another one of said phases.

14. A polyphase circuit interrupter including main switch means in circuit with an electric system, overload responsive means coupled to said system, switch opening means coupled to said overload responsive means for opening said main switch means upon the occurrence of an overload current in said system, an electrical energy source, a plurality of overload indicating means, each of said overload indicating means being connected to a different phase of said system and each including input circuit means coupled to its associated phase for deriving a D.C. voltage signal functionally related to the current in its associated phase and capacitor means coupled to its input circuit means for receiving a charge proportional to the voltage signal derived thereby, each of said overload indicating means also including an electroresponsive indicator and a first electronic circuit means having a control element connected to its associated capacitor and output means connected to said switch opening means and to its indicator and operable to connect said indicator to said energy source upon the occurrence of an overload in its associated phase and upon the actuation of said switch opening means, ground fault sensing means coupled to said switch opening means and operative to actuate said switch opening means upon the occurrence of a ground fault, an electroresponsive ground fault indicator, ground electronic switching circuit means having a control element connected to said ground fault sensing means and a pair of output circuit means connected to said ground fault indicator and to said switch opening means, said ground electronic switching circuit means being operative to connect said ground fault indicator to said energy source upon the occurrence of a ground fault in said system and upon the operation of said switch opening means, said switch opening means being operable upon the completion of a switch opening operation to open circuit each of said indicators.

15. A polyphase circuit interrupter including main switch means in circuit with an electric system, overload responsive means coupled to said system, switch opening means coupled to said overload responsive means for opening said main switch means upon the occurrence of an overload current in said system, an electrical energy source, a plurality of overload indicating means, each of said overload indicating means being connected to a different phase of said system and each including input circuit means coupled to its associated phase for deriving a D.C. voltage signal functionally related to the current in said system and capacitor means coupled to its input circuit means for receiving a charge proportional to the voltage signal derived thereby, each of said overload indicating means also including an electroresponsive indicator and a uni-junction transistor having its emitter connected to its associated capacitor and its base-one-base-two circuit connected to said switch opening means, said uni-junction transistor being forward biased when a fault occurs in its associated phase and upon the actuation of said switch opening means, each of said overload indicating means also including a controlled rectifier having its gate electrode connected to the base-one electrode of said uni-junction transistor and its anode-cathode circuit connected to its associated indicator and to said switch opening and operable when its uni-junction is forward biased and when said switch opening means is actuated to connect said indicator to said energy source, ground fault sensing means coupled to said switch opening means and operative to actuate said switch opening means upon the occurrence of a ground fault, an electroresponsive ground fault indicator, transistor circuit means having a base electrode connected to said ground fault sensing means and an emitter-collector circuit means connected to said ground fault indicator and to said switch opening means, said transistor circuit means being operative to connect said ground fault indicator to said energy source upon the occurrence of a ground fault in said system and upon the operation of said switch opening means, said switch opening means being operable upon the completion of a switch opening operation to open circuit each of said indicators.

References Cited
UNITED STATES PATENTS 2,697,217  12/1954  Jeffers _____ 317—18 X
2,844,765  7/1958   Sosnoski _____ 317—18

MILTON O. HIRSHFIELD, *Primary Examiner.*

R. V. LUPO, *Assistant Examiner.*